United States Patent [19]

Bedford et al.

[11] Patent Number: 5,081,095
[45] Date of Patent: Jan. 14, 1992

[54] METHOD OF MAKING A SUPPORT CONTAINING AN ALUMINA-CERIA WASHCOAT FOR A NOBLE METAL CATALYST

[75] Inventors: Raymond E. Bedford, Burton; Chih-Hao M. Tsang, Davison, both of Mich.

[73] Assignee: General Motors Corporation, Detroit, Mich.

[21] Appl. No.: 580,029

[22] Filed: Sep. 10, 1990

[51] Int. Cl.$^5$ .................. B01J 21/04; B01J 23/10; B01J 23/40
[52] U.S. Cl. .................. 502/304; 502/439; 423/213.5
[58] Field of Search .................. 502/304, 439; 423/213.5

[56] References Cited

U.S. PATENT DOCUMENTS

| | | | |
|---|---|---|---|
| 3,226,340 | 12/1965 | Stephens et al. | 252/465 |
| 3,789,022 | 1/1974 | Schenker et al. | 252/462 |
| 3,819,535 | 6/1974 | Huba et al. | 252/462 |
| 3,993,572 | 11/1976 | Hindin et al. | 502/304 |
| 4,708,946 | 11/1987 | Ohata et al. | 502/304 |
| 4,940,685 | 7/1990 | Sauvion | 502/304 |

*Primary Examiner*—W. J. Shine
*Attorney, Agent, or Firm*—George A. Grove

[57] ABSTRACT

A high surface area ceria-alumina washcoat is disclosed in which the ceria is prepared from cerium acetate.

8 Claims, No Drawings

METHOD OF MAKING A SUPPORT CONTAINING AN ALUMINA-CERIA WASHCOAT FOR A NOBLE METAL CATALYST

This invention pertains to automotive exhaust catalysts. More particularly, it relates to more durable alumina/ceria carriers or washcoats for noble metals in catalytic converters for gasoline-fueled automotive engines.

BACKGROUND

Thermally stable, high surface area (e.g., >100 m2/g) alumina in the form of small beads or as micron-sized washcoat particles has long been used as a carrier for finely dispersed particles of noble metals in the treatment of automobile exhaust. More recently, ceric oxide ($CeO_2$, also called ceria) has been incorporated into the alumina particles or mixed with them as the carrier for the dispersed particles of platinum and/or palladium and rhodium. Initially, ceria was used in small amounts, about 2 to 3 percent by weight of the alumina. Now it is being used in larger proportion of the alumina, about 20 to 40 percent by weight of the carrier. It is now necessary to give attention to how to best utilize the ceria from the standpoint of catalyst cost and performance.

Accordingly, it is an object of our invention to provide an improved method of preparing an alumina-ceria catalyst support for the treatment of automotive engine exhaust gases.

It is a more specific object of our invention to provide a method of forming a high surface area ceria for combination with alumina as a catalyst carrier washcoat on a monolithic-type catalyst substrate. The resultant washcoat improved catalyst durability as reflected in the high conversion of HC, CO and NOx even after prolonged thermal aging of the catalyst.

It is another object of our invention to provide a more durable alumina-ceria catalyst carrier washcoat for ceramic or metallic monolith-type catalyst substrates.

BRIEF SUMMARY OF THE INVENTION

In accordance with a preferred embodiment of our invention, these and other objects and advantages are accomplished as follows.

We use a new method of preparing a thermally stable, high surface area mixture of alumina and ceria particles that make up a washcoat-type carrier for noble metal catalysts for the conversion of automotive exhaust gas constituents. A specific precursor material is used for the preparation of the ceria in that we employ a cerium acetate as the starting material. When cerium acetate is calcined, a ceric oxide is formed that is chemically the same, of course, as other cerias, but its unique particulate form provides it with characteristics particularly suitable in the catalytic converter environment.

In general, we start with a wet cerium carbonate which is treated with acetic acid to form a cerium acetate. The cerium acetate is dried and calcined suitably at a temperature of about 425° C. to 450° C. to form a high surface area ceric oxide, $CeO_2$ (HSA ceric oxide). A mixture of 70 mole percent high surface area cerium oxide and 30 mole percent of the cerium acetate is then prepared. This mixture is wet milled with alumina in proportions that will ultimately yield about 50 to 80 weight percent alumina and the balance cerium oxide. Small amounts of other materials such as known oxide stabilizers may be added if desired. The wet mixture is milled for a period of time so as to achieve a substantially uniform mixture of the ceric oxide and alumina and cerium acetate. Some of the cerium acetate dissolves in the water and the solution is adsorbed onto the alumina. Ultimately, a mixture of average particle size of about 0.5 to 1 micron is obtained. The viscosity of the milled slurry may be adjusted if necessary, and the material is then applied as a thin layer to the exhaust gas treatment surfaces of a ceramic or metal monolith configured for the treating of automotive engine exhaust gases.

The coated monolith is then suitably dried and heated in air (calcined) at a temperature of 425° C. or so to obtain a film-like coating of fine ceria particles and alumina particles. The alumina particles may also carry some ceric oxide. This washcoated monolith body may then be treated by the application of finely dispersed noble metal particles. This is accomplished by providing a suitable solution of noble metal salts and impregnating the washcoat layer of the monolith with the solution to form a suitable loading of one or more noble metals such as, for example, platinum and rhodium. After impregnation with the noble metal, the washcoated monolith is again dried and calcined to fix the finely dispersed noble metal particles on the washcoat layer.

Alternatively, we can mix the precious metal precursors into the mill and then coat the monoliths with the activated slurry.

We have found that a washcoat layer thus prepared displays and retains excellent conversion efficiency for each of unburned hydrocarbons (HC), carbon monoxide (CO) and nitrogen oxides (NOx), even after prolonged exposure of the catalyst to high temperature exhaust gas. While the ceria and alumina each contribute to the performance of the washcoat in providing the durability of the catalytic material, it is believed that the use of cerium acetate as a precursor for the formation of the ceria provides a significant improvement in the long-term performance of the catalyst.

These and other objects and advantages of our invention will be more clearly understood in view of a detailed description which follows.

DETAILED DESCRIPTION OF THE INVENTION

A high surface area cerium oxide is an important component of our catalyst composition, and we employ a preferred method of preparing such a cerium oxide compound so that it is relatively thermally stable and retains usable surface area despite prolonged exposure to oxygen and other exhaust constituents at elevated temperatures. We prefer to prepare the high surface area cerium oxide from a wet cerium carbonate about 35 percent by weight water) by first heating the carbonate with acetic acid and calcining the product (presumably cerium acetate) in air to obtain a ceria with a BET surface area of approximately 80 to 100 meters$^2$/gram. Our ceria can be prepared from other cerium acetate starting material.

EXAMPLE OF THE PREPARATION OF HIGH SURFACE AREA CERIUM OXIDE

Three thousand grams of wet, solid $Ce_2(CO_3)_3$ (about 35 percent water) was reacted with 1569 grams of glacial acetic acid. Carbon dioxide was evolved. The resulting product (cerium acetate) was dried and calcined at about 425° C. for about two hours in a stream of air flowing at a rate of about 30 standard cubic feet per minute (SCFM). A thermally stable, high surface area (HSA) ceric oxide was produced.

Ceric oxides prepared by this method typically have BET surface areas in the range of 80 to 100 m$^2$/g. Preferably, a ceric oxide with a surface area of at least 80 m$^2$/g is obtained. We were interested in determining how the surface area of such ceric oxide was affected by heating in air at 950° C. for four hours. We view such a heating schedule as useful in assessing the performance of automotive exhaust treatment catalytic materials in resisting thermal degradation. It was found that after exposure at 950° C. in air for four hours, our calcined acetate-based ceric oxide retained a BET surface area of 12 to 16 m$^2$/g. Although considerable surface area is lost by such heating, such residual area is very useful in providing durability in our catalyst.

It is recognized that other forms of ceric oxide can be prepared by the calcination of other cerium compounds. However, these other forms have not retained as much of their surface area in our thermal aging tests. We have prepared representative ceric oxides by the following steps: (a) cerium carbonate was calcined in air at 425° C. to CeO$_2$; (b) wet cerium nitrate was calcined to CeO$_2$ at 425° C.; and (c) ceric nitrate was converted to ceric citrate and calcined to ceric oxide at 425° C. The cerium carbonate-bas d ceric oxide had an initial BET surface area of 60 to 70 m$^2$/g, but upon heating at 950° C. for four hours, its effective surface area fell to about 1.5 m$^2$/g. The cerium nitrate-based ceric oxide had an initial BET surface area of 50 to 60 m$^2$/g and its surface area diminished to 6 m$^2$/g after the heating schedule at 950° C. The ceric citrate-based ceric oxide had an initial surface area of 60 to 70 m$^2$/g and a post-950° C. heating regimen surface area of about 6 m$^2$/g.

EXAMPLE OF THE PREPARATION OF THE WASHCOAT OF THIS INVENTION

A liquid slurry was prepared containing 428 grams of gamma alumina, 22 grams of alumina monohydrate, 122 grams of HSA cerium oxide (prepared from cerium acetate as described above), 97 grams of cerium acetate (prepared from cerium carbonate as described above), 10 grams of acetic acid and 571 grams of water. This liquid slurry mixture was prepared so that it had an oxide content of about 50 percent by weight. The mixture may suitably contain 45 to 55 percent by weight oxides. The content of the above mixture was such that it would yield 28 percent by weight of ceric oxide and 72 percent by weight of alumina. The cerium-containing constituents of the mixture are proportioned such that 70 percent of the cerium is provided by the HSA cerium oxide and 30 percent by the cerium acetate. About 5 percent of the alumina is added as alumina monohydrate. The acetic acid is employed to peptize the alumina monohydrate, which will provide bonding strength after washcoating. Optionally, other oxides such as nickel oxide, lanthanum oxide, potassium oxide and the like can be added to the formulation for their known effect, for hydrogen sulfide suppression and/or improvement in the conversion performance of the catalyst The proportion of HSA cerium oxide to cerium acetate illustrated above (i.e., 70 mole percent to 30 mole percent) is preferred. However, HSA cerium oxide may make up 50 to 80 mole percent of the oxide acetate mixture and cerium acetate 20 to 50 mole percent of the mixture. Suitably, 3 to 8 weight percent of the alumina is added as aluminum hydrate.

The above-specified 1250 gram slurry was milled in a container with 4000 grams of quarter inch alumina mill balls at room temperature for three hours. The viscosity of the recovered slurry from the mill was adjusted to about 400 centipoise (suitably 200 cp to 600 cp). The viscosity of the slurry can be adjusted if necessary by adding water to decrease viscosity or small amounts of acid to increase viscosity. The particle size in the resulting slurry is about 0.5 to 1 micron.

The slurry is now ready to be applied as a washcoat layer on the exhaust gas contacting surfaces of a suitable monolith-type catalyst support device. For purposes of illustration selected an 85 cubic inch ceramic monolith (cordierite) with 400 cells (longitudinal exhaust flow passages) per square inch. About 1000 grams of the slurry was drawn down through the cell openings to coat the walls of the cells with the washcoat material. After the excess slurry was removed, the coated monolith was dried for eight hours at 120° C. and calcined at 427° C. in air for one hour. The weight of the calcined washcoat was 275 grams.

At this stage, the cordierite monolight carried a thin coating of our alumina-ceria washcoat material. The washcoat is characterized as a mixture of high surface area ceria particles and high surface area gamma alumina particles that are about 0.5 to 1 micron in particle size. It is believed that the alumina particles also carry some ceric oxide due to impregnation by water-dissolved cerium acetate.

Following the formation of the calcined washcoat layer, platinum and rhodium were then loaded onto the washcoat. Aqueous solutions of amine chloride complex compounds of platinum and rhodium were formed, and the solutions were impregnated into the alumina and ceria particles of the washcoat. The solution contained suitable quantities of platinum and rhodium such that the monolith carried a total of 0.038 troy ounces of platinum metal and 0.0038 troy ounces of rhodium metal on the walls of its cells after calcination at 427° C for one hour in air. A number of like monolithic catalyst bodies have been prepared and assembled (canned) in stainless steel catalytic converters of current commercial manufacture for testing.

TESTING AND COMPARISON WITH OTHER WASHCOATS

Before testing the above prepared catalyst for its exhaust gas constituent conversion efficiency, it was subjected to an accelerated high temperature engine operating schedule for 75 hours. The aging of the converter was done in conjunction with a Chevrolet 4.3 liter engine operated in conjunction with a standard water brake dynamometer The engine speed and dynamometer loading were conducted in accordance with a rapid aging test (RAT) for the catalyst (catalyst inlet temperature of 700° C. plus power enrichment and air injection to produce 900° C. temperature spikes) for 75 hours. The aging effect on the catalyst of such a 75 hour accelerated schedule is known to be equivalent to that of a 50,000 mile normal driving schedule.

Following the RAT catalyst aging test, the converter was then operated in connection with a 2.5 liter engine on a Buick Somerset vehicle in accordance with the Federal Test Procedure (FTP test). Our alumina/ceria washcoat carrier in combination with the described three-way platinum-rhodium catalyst obtained or produced conversion efficiencies as follows: HC, 86 percent; CO, 88 percent and NOx, 81 percent. Such conversion efficiencies on the FTP test cycle following the rapid aging test are considered to be very good.

For purposes of comparison, alumina-ceria washcoats based on other ceria precursor materials were prepared for evaluation. Each of the washcoats was prepared to contain gamma alumina and a ceria in the proportions of 72 weight percent alumina and 28 weight percent ceria. The washcoats were calcined as described above and impregnated with the same loadings of platinum and rhodium applied in the same manner as described above onto a cordierite ceramic monolith of the same size. The thermal aging and testing of the different washcoat catalysts was precisely as described above in connection with our novel washcoat material.

In a first comparison washcoat, the precursor of the ceria was cerium carbonate. All of the ceria content of the washcoat came from cerium carbonate $Ce(CO_3)_3$ which was added into the mill and calcined as a part of the washcoat. The FTP cycle conversion efficiencies for the catalyst based on the cerium carbonate precursor material were respectively: HC, 80 percent; CO, 82 percent and NOx, 72 percent.

A second washcoat comparison sample was prepared in which the sole source of the ceria was cerium nitrate, $Ce(NO_3)_3$ An aqueous cerium nitrate solution was added with the alumina in the ball mill and upon coating of the cerium nitrate impregnated alumina on the cordierite monolith and calcining the cerium nitrate was converted to ceric oxide. Following impregnation with platinum and rhodium and aging in accordance with the RAT schedule, this catalyst demonstrated the following conversion efficiencies on the FTP procedure: HC, 83 percent; CO, 83 percent and NOx, 79 percent.

A third comparison washcoat material was prepared utilizing our high surface area ceric oxide as the sole source of ceria in conjunction with the gamma alumina. The HSA ceria and gamma alumina were ball milled together and the resulting slurry applied to an 85 cubic inch volume cordierite monolith. After calcining, a washcoat of finely divided particulate ceria and gamma alumina was obtained. The washcoat was impregnated as with the above samples with platinum and rhodium and the catalyst subjected to the rapid aging test. Following the rapid aging test, this catalyst demonstrated the following conversion efficiencies during the FTP test procedure: HC, 82 percent; CO, 84 percent and NOx, 74 percent.

A comparison of the conversion efficiencies of the four different washcoat materials reveals that the alumina-ceria washcoat prepared by the practice of our invention yielded higher conversion efficiencies for each of unburned hydrocarbons, carbon monoxide and nitrogen oxides than any of the other catalysts produced for any of the exhaust gas constituents. Measured as a percent reduction in the amount of unconverted gases, our washcoat formulation provides a 17 percent better reduction in the unconverted hydrocarbons than the best other performing catalyst with respect to hydrocarbons. Our converter produced a 25 percent better reduction in the uncoverted carbon monoxide than the next better converter and a 9 percent better reduction in the unreacted NO when compared to the next b st washcoat performance.

We believe that the use of the combination of high surface area ceric oxide and cerium acetate with the high surface area alumina in the preparation of our washcoat enhances the exhaust gas treatment process by more than one mechanism The distinct particles of HSA ceric oxide contribute to the conversion process. However, it is also likely that some of the dissolved ceric acetate used in the practice of our process permeates the alumina particles structure and introduces ceric oxide into the alumina for high temperature transformation control and high surface area stabilization. Thus, it appears that our washcoat benefits from the presence of both distinct particles of our specially prepared HSA $CeO_2$ and the fact that the cerium acetate impregnated into the alumina particles may also be converted to HSA $CeO_2$ upon calcination and constitutes a portion of the alumina particles. In any event, whether our theory is correct or not, we have demonstrated that using a combination of our special HSA $CeO_2$ and cerium acetate in the preparation of alumina-ceria washcoats, benefit is obtained in high conversion efficiencies, especially after aging of the catalyst.

We have run further comparison tests of alumina-ceria washcoat materials in which the ceria was applied to the alumina by a post-impregnation practice following calcination of the alumina in a washcoated film on a cordierite monolith substrate. In other words, we first formed a washcoat of alumina particles on the cordierite monolith and subsequently impregnated the calcined alumina with an aqueous solution of a ceric oxide precursor material.

In one example, we formed a washcoat containing 85 percent alumina and 15 percent by weight ceria by impregnating the calcined alumina with a cerium nitrate solution. The cerium nitrate impregnated alumina was then calcined for one hour in air at 427° C. to form the alumina ceria washcoat. This washcoat in turn was impregnated with a platinum-rhodium catalyst in the same loadings as described above. The platinum-rhodium impregnated cordierite monolith was then placed in a stainless steel converter can and thermally aged as described above and then tested in accordance with the Federal Test Procedure. The conversion efficiencies for this cerium nitrate impregnated alumina were as follows: HC, 67 percent; CO, 65 percent and NOx, 59 percent. It is seen that these conversion efficiencies are not comparable to those obtained by the catalyst prepared in accordance with the practice of our invention.

Another comparison catalyst was prepared in which a calcined aluminum washcoated cordierite monolith was impregnated with cerium nitrate to form a ceria content of only 8 percent. After completion of the catalyst-making process, thermal aging and testing by the FTP test the conversion efficiencies were found to be as follows: HC, 68 percent; CO, 62 percent and NOx, 59 percent.

Finally, we prepared a catalyst in which a calcined alumina washcoat on a cordierite monolith was impregnated with a cerium acetate solution of sufficient volume to provide an alumina-ceria washcoat containing 8 percent ceria. After completion of the catalyst-making procedure, the RAT aging practice and finally testing by the FTP procedure, exhaust gas conversion efficiencies were obtained as follows: HC, 80 percent; CO, 75 percent and NOx, 70 percent.

It is seen that utilizing a cerium acetate to post-impregnate an alumina washcoat provides a better washcoat material than impregnation with cerium nitrate. However, the final catalyst performance after aging is still not as food as when both a cerium acetate and our high surface area ceria are used in the preparation of the alumina-ceria washcoat. Thus, we conclude that we have discovered an improved process for making alumina-ceria washcoats in which we employ both a high surface area ceric oxide prepared from cerium acetate and cerium acetate in the preparation of the alumina-ceria washcoat material.

In summary, we practice the method aspect of our invention as follows. We prefer the use of high surface area aluminas such as, for example, the transitional chi, gamma, delta and theta alumina. These are thermally stable aluminas which retain a preponderance of their high surface area despite exposure to hot exhaust gases. Our final washcoat preferably contains 50 to about 8 percent by weight alumina and correspondingly 20 to 50 percent ceric oxide prepared in accordance with our practice. Other known oxide stabilizers or modifiers may be used, but the proportions of the ceria and alumina should be in the stated ranges.

We use a high surface area ceric oxide which is prepared from cerium acetate as described above. In the preparation of the washcoat coating mixture, we also include cerium acetate with the high surface area alumina oxide and alumina. We prefer to use a mixture of 70 mole percent high surface area cerium oxide to 30 mole percent cerium acetate. However, other mixtures can be used. Mixtures containing equal molar parts of cerium acetate and HSA cerium oxide can be used up to mixtures containing only 20 percent cerium acetate and 80 percent HSA cerium oxide.

From the viewpoint of a product, our washcoat can be viewed as containing HSA ceric oxide, which is based on a cerium acetate precursor material. Furthermore, the final product is the result of the use of such a high surface area ceric oxide in conjunction with additional cerium acetate in the preparation of the final alumina-ceria washcoat mixture.

While we have described the practice of our invention in conjunction with a ceramic monolith, it is to be understood that our washcoat may also be used on metallic-type monolith catalyst carriers. We have also described the use of our washcoat in conjunction with a three-way platinum-rhodium catalyst. It is to be understood that our washcoat is also useful in conjunction with other noble metal mixtures such as palladium or mixtures of palladium with platinum or rhodium and the like. It is also to be understood that suitable noble metal compounds may be wet milled with the oxide mixture prior to washcoat application, or the noble metal compounds may be applied by a post-impregnation process to the calcined washcoat as described.

While our invention has been described in terms of a few specific examples thereof, it will be appreciated that other forms could readily be adopted by one skilled in the art. Accordingly, the scope of our invention is to be considered limited only by the following claims.

The embodiments of the invention in which an exclusive property or privilege is claimed are defined as follows:

1. A method of making a thermally stable, high surface area, particulate catalyst support for the treatment of the exhaust from a gasoline-fueled automotive vehicle engine, comprising
    calcining cerium acetate to form a cerium oxide having a surface area of at least 80 $m^2/g$,
    wet milling a mixture comprising a said cerium oxide, cerium acetate and a high surface area alumina in proportions such that the overall cerium content as cerium oxide and aluminum content as aluminum oxide are respectively 20 to 50 percent by weight and 80 to 50 percent by weight to obtain a uniform slurry mixture of fine particles,
    applying the mixture as a washcoat layer to exhaust gas flow contacting surfaces of a monolithic-type catalyst support body, and
    drying and calcining the coated body to convert the wet coating to an adherent oxide coating wherein the cerium oxide and alumina are in said proportions, the coating being suitable for carrying dispersed particles of one or more noble metals.

2. The method of claim 1 where the cerium acetate is prepared by the reaction of a wet mass of cerium carbonate with acetic acid.

3. The method of claim 1 where the adherent oxide coating is impregnated with a solution of noble metal salt and subsequently dried and calcined to form a dispersion of the noble metal thereon.

4. The method of claim 1 where a noble metal catalyst precursor compound is included in the wet milling mixture.

5. An alumina-ceria catalyst washcoat support on a monolithic-type support body when prepared by the method of claim 1.

6. The method of claim 1 wherein the cerium oxide constitutes 50 to 80 mole percent of the total of the content of cerium oxide plus cerium acetate in the wet milling mixture.

7. An alumina-ceria catalyst washcoat support on a monolithic-type support body when prepared by the method of claim 2.

8. An alumina-ceria catalyst washcoat support on a monolithic-type support body when prepared by the method of claim 6.

* * * * *